(12) United States Patent  
Birk

(10) Patent No.: US 9,372,329 B2
(45) Date of Patent: Jun. 21, 2016

(54) METHOD FOR CORRECTING IMAGE DISTORTIONS IN A CONFOCAL SCANNING MICROSCOPE

(75) Inventor: Holger Birk, Meckesheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1089 days.

(21) Appl. No.: 13/339,414

(22) Filed: Dec. 29, 2011

(65) Prior Publication Data

US 2012/0169864 A1     Jul. 5, 2012

(30) Foreign Application Priority Data

Dec. 29, 2010  (DE) .......................... 10 2010 061 612

(51) Int. Cl.
| | |
|---|---|
| H04N 7/12 | (2006.01) |
| H01J 3/14 | (2006.01) |
| G06K 9/32 | (2006.01) |
| G02B 21/00 | (2006.01) |
| G02B 21/36 | (2006.01) |

(52) U.S. Cl.
CPC .......... *G02B 21/0036* (2013.01); *G02B 21/365* (2013.01); *G02B 21/0048* (2013.01); *G02B 21/367* (2013.01)

(58) Field of Classification Search
CPC ..................................... H01J 3/14; G06K 9/32
See application file for complete search history.

(56) References Cited

U.S. PATENT DOCUMENTS

| | | | | |
|---|---|---|---|---|
| 4,593,406 | A * | 6/1986 | Stone | 382/288 |
| 5,748,199 | A * | 5/1998 | Palm | 345/473 |
| 5,825,670 | A | 10/1998 | Chernoff et al. | |
| 2002/0008904 | A1 | 1/2002 | Engelhardt | |
| 2003/0055588 | A1 | 3/2003 | Nikitin | |
| 2009/0008539 | A1* | 1/2009 | Steinert | 250/235 |

FOREIGN PATENT DOCUMENTS

| | | |
|---|---|---|
| DE | 19654210 A1 | 6/1998 |
| DE | 10115578 A1 | 10/2002 |
| DE | 102004053905 A1 | 5/2006 |
| DE | 1200510047200 200 A1 | 4/2007 |
| EP | 1107037 A2 | 6/2001 |
| JP | 2004053922 A | 2/2004 |
| JP | 2005006854 A | 1/2005 |
| JP | 2005156756 A | 6/2005 |
| WO | 2008032055 A1 | 3/2008 |

* cited by examiner

*Primary Examiner* — Sath V Perungavoor
*Assistant Examiner* — Patricia I Young
(74) *Attorney, Agent, or Firm* — Patentbar International, P.C.

(57) ABSTRACT

In order to identify scan coordinate values ($\phi_n$, $\theta_n$) for operating a scanning unit (28) of a confocal scanning microscope (20), spherical scan coordinate values ($\phi_n$, $\theta_n$) are identified, as a function of Cartesian image coordinates ($X_n$, $Y_n$) of image points of an image (60) to be created of a sample (32), with the aid of a coordinate transformation of the Cartesian image coordinate values ($X_n$, $Y_n$) into a spherical coordinate system. The scanning unit (28) is operated as a function of the spherical scan coordinate values ($\phi_n$, $\theta_n$).

9 Claims, 4 Drawing Sheets

Fig. 3

$$\begin{pmatrix} a \\ b \\ c \end{pmatrix} = \begin{pmatrix} r\cos(\theta)\cos(\varphi) \\ r\cos(\theta)\sin(\varphi) \\ r\sin(\theta) \end{pmatrix} \quad (F1)$$

$$r(\theta;\varphi) = \frac{r_0}{\cos(\theta)\cos(\varphi)} \quad (F2)$$

$$x = r_0 \tan(\varphi) \quad (F3)$$

$$y = \frac{r_0}{\cos(\varphi)} \tan(\theta) \quad (F4)$$

$$\varphi_i = \tan^{-1}\left(\frac{x_i}{r_0}\right) \quad (F5)$$

$$\theta_i = \tan^{-1}\left(\frac{y_i \cos(\varphi_i)}{r_0}\right) = \tan^{-1}\left(\frac{y_i \cos(\tan^{-1}(\frac{x_i}{r_0}))}{r_0}\right) \quad (F6)$$

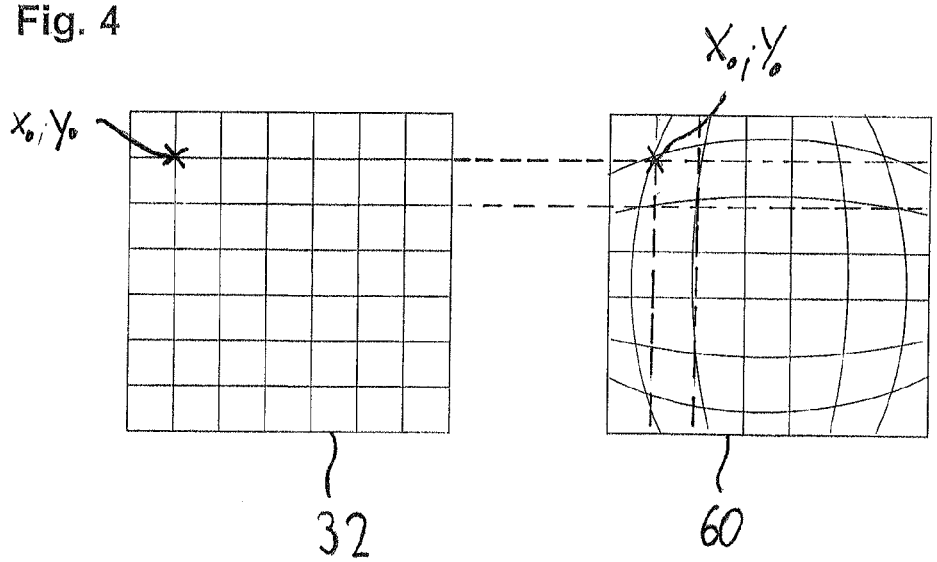

Fig. 4

| $X_0; Y_0$ | $\varphi_0; \theta_0$ | $\varphi_{0K}; \theta_{0K}$ | $\varphi_0+\varphi_{0L}; \theta_0+\theta_{0L}$ |
|---|---|---|---|
| $X_0; Y_1$ | $\varphi_0; \theta_1$ | $\varphi_{0K}; \theta_{1K}$ | $\varphi_0+\varphi_{0L}; \theta_1+\theta_{1L}$ |
| $X_{0; Y2}$ | $\varphi_0; \theta_2$ | $\varphi_{0K}; \theta_{2K}$ | $\Phi_0+\varphi_{0L}; \theta_2+\theta_{2L}$ |
| | | | |
| $X_1; Y_0$ | $\varphi_1; \theta_0$ | $\varphi_{1K}; \theta_{0K}$ | $\varphi_1+\varphi_{1L}; \theta_0+\theta_{0L}$ |
| | | | |

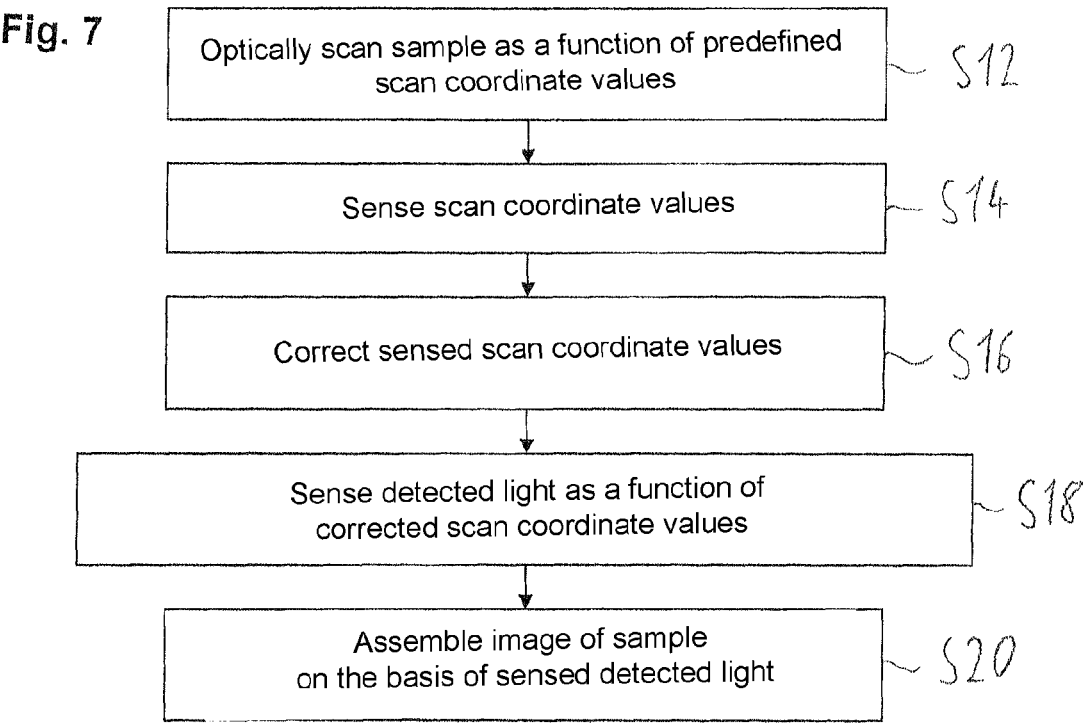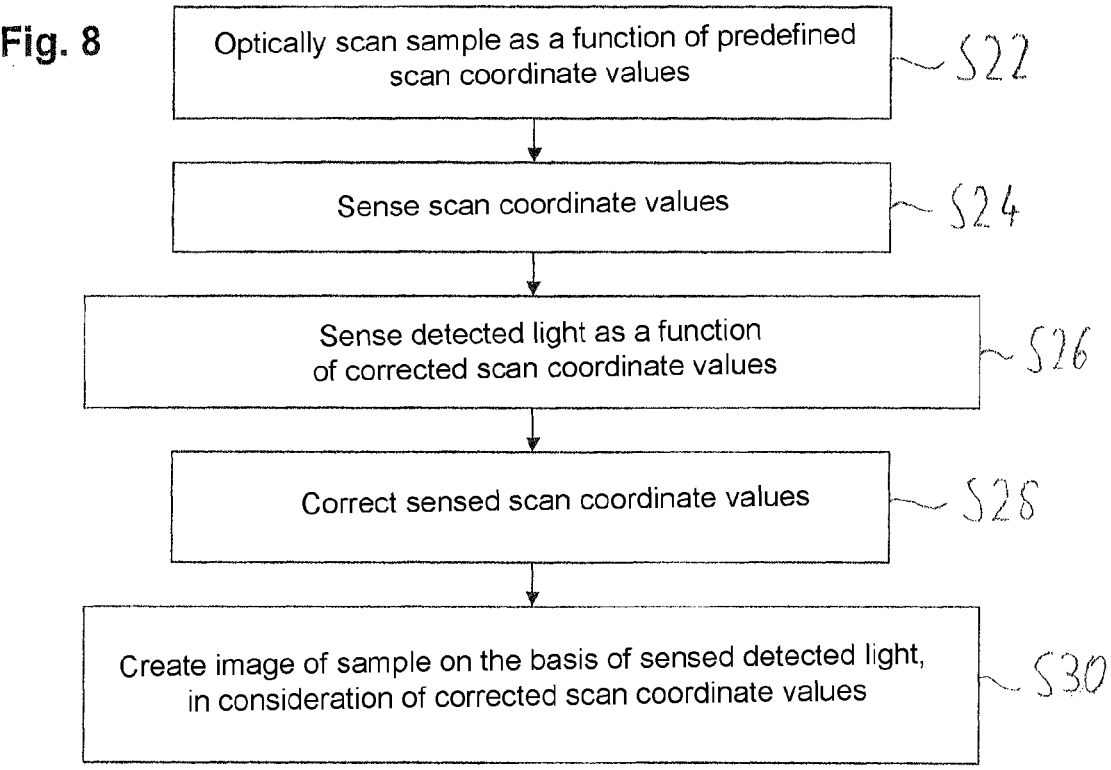

METHOD FOR CORRECTING IMAGE DISTORTIONS IN A CONFOCAL SCANNING MICROSCOPE

RELATED APPLICATIONS

This application claims priority to German Patent Application No. DE 10 2010 061 612.5, filed Dec. 29, 2010, which is incorporated herein by reference in its entirety.

FIELD OF THE INVENTION

The invention relates to a method for identifying scan coordinate values or corrected scan coordinate values for operating a scanning unit of a confocal scanning microscope. The invention further relates to a method for creating an image of a sample with the aid of a confocal scanning microscope.

BACKGROUND OF THE INVENTION

A confocal scanning microscope can be used, for example, to excite fluorescing substances in samples, in particular tissue samples, and to detect the fluorescent light resulting therefrom. The principle is that an illumination light beam is directed via a scanning unit onto a sample, the scanning unit being operated with a driving signal that encompasses scan coordinate values. The scan coordinate values are representative of positions of positioning elements of the scanning unit. The fluorescent light radiated from the sample is directed, via the scanning unit and a beam splitter that separates the fluorescent light from the illumination light, onto a detection pinhole that allows a small portion of the detected light to pass through to a detector. The detected light sensed with the aid of the detector is detected as a function of the scan coordinate values. In other words, in addition to the signal detected by the scanning unit, the position occupied by the positioning elements of the scanning unit upon detection of the detected light is also recorded, the positions being represented by the scan coordinate values.

The detected light can be detected as a function of the scan coordinate values with which the scanning unit is driven; if the scanning unit (in particular its positions) is controlled in closed-loop fashion, the predefined scan coordinate values can also be referred to as "target" scan coordinate values. Alternatively thereto, true positions of the scanning unit can be sensed with the aid of sensors, and these sensed scan coordinate values can then be associated with the detected light detected at the sensed positions; once again, if the positions of the scanning unit are controlled in closed-loop fashion, these sensed scan coordinate values can also be referred to as "actual" scan coordinate values.

During optical scanning of the sample or thereafter, the image of the sample can be assembled on the basis of many acquired image points, the position of each image point being determined by a pair of image coordinate values, and corresponding scan coordinate values being associated with the image coordinate values. It is known to determine this association of the image coordinate values with the scan coordinate values by means of approximations. This can result, however, in distortions and/or deformations, in particular at the edges of the image of the sample.

The distortions of the images occur not only because of the approximately calculated scan coordinate values, but also because of optical effects of the optical elements of the confocal scanning microscope which are not considered in known scanning microscopes or methods for operating the scanning microscopes.

The distortions are problematic in particular when an overall image of a sample is to be assembled from multiple juxtaposed individual images, since the images then do not match one another at their edges. This can furthermore be problematic when the image of the sample, acquired confocally in this fashion, is to be overlaid on a wide field image, since such distortions at the image edges do not occur with wide field imaging and the two images of the sample thus do not fit together, especially at the edges of the images.

SUMMARY OF THE INVENTION

It is an object of the present invention to establish a method for identifying scan coordinate values or corrected scan coordinate values for operating a scanning unit of a confocal scanning microscope, or a method for creating an image of a sample with the aid of a scanning microscope, which enable the creation of a precise image of the sample, in particular at the image edges, using simple means.

The object is achieved by the features of the independent claims. Advantageous embodiments are indicated in the dependent claims.

According to a first aspect, the invention is characterized by the fact that spherical scan coordinate values are identified, as a function of Cartesian image coordinates of image points of an image to be created of a sample, with the aid of a coordinate transformation of the Cartesian image coordinate values into a spherical coordinate system. The scanning unit is operated as a function of the spherical scan coordinate values.

Transformation of the Cartesian image coordinate values into the spherical coordinate system contributes to a precise association of the image points of the image of the sample, which were identified by detection of the detected light, with positions of the scanning unit of the confocal scanning microscope, the positions of the scanning unit being predefined by the spherical scan coordinate values. The result of this is that the image of the sample corresponds precisely to the sample, in particular at the edges of the image.

The spherical scan coordinate values exist in a format, or are formatted, such that the scanning unit is operable as a function of the spherical scan coordinate values. This means in this connection, for example, that the spherical scan coordinate values are saved in an association specification, for example a table, that is then stored on a memory unit of a control unit of the scanning microscope and is read out by the control unit during operation of the confocal scanning microscope. A driving signal is modulated in such a way that positioning elements of the scanning unit assume positions that correspond to the spherical scan coordinate values. Alternatively thereto, the spherical scan coordinate values can be formatted in exactly the way in which they already exist (without transformation) as a driving signal, for example modulated therein; and these data are stored, for example in digitized fashion, on the memory unit of the control unit. The positions of the scanning unit are referred in each case to angles enclosed between an illumination light beam deflected with the aid of the scanning unit, and a reference light beam deflected with the aid of the scanning unit in a reference position of the scanning unit.

In an advantageous embodiment, different zoom steps of the scanning microscope are considered when the spherical scan coordinate values are identified. "Zoom" means a limitation of a region or of a coordinate region. The zoom steps correspond to magnification steps, and can also be referred to as such. It is particularly advantageous in this connection if the different zoom steps are considered by predefining spacings of the image points with respect to one another as a function of the zoom steps. Consideration of the zoom steps makes it possible always to ensure the same precision in image creation upon later operation of the scanning microscope, regardless of the zoom step.

According to a refinement, only first spherical scan coordinate values are identified with the aid of the coordinate transformation, and second spherical scan coordinate values are identified by interpolation of the first scan coordinate values. This is advantageous in particular when only limited computing performance is available, or when identification of the spherical scan coordinate values must be carried out particularly quickly, for example during operation of the scanning microscope.

A refinement provides that the predefined scan coordinate values are corrected on the basis of the spherical scan coordinate values. This allows an already existing scanning microscope, in particular its scanning unit, to be driven in such a way that precise identification of the images is possible. The predefined scan coordinate values can, for example, be replaced by the spherical scan coordinate values; or only differences between the predefined scan coordinate values and the spherical scan coordinate values can be identified, and the predefined scan coordinate values are corrected on the basis only of the differences, which in this connection can also be referred to as "correction terms."

According to a second aspect, the invention is notable for the fact that an illumination light beam is directed via a scanning unit of the scanning microscope onto a reference sample. The scanning unit is driven, as a function of predefined scan coordinate values, in such a way that the illumination light beam optically scans the reference sample. Detected light proceeding from the reference sample is sensed as a function of the predefined scan coordinate values. The predefined scan coordinate values are associated with image coordinate values of image points of an image to be identified of the reference sample. The image points at the image coordinate values are identified on the basis of the detected light sensed at the corresponding predefined scan coordinate values. The image of the reference sample is created on the basis of the identified image points. The image of the reference sample is compared with the reference sample, and the predefined scan coordinate values are corrected as a function of the comparison.

Creation of the image of the reference sample, and correction of the predefined scan coordinate values on the basis of the image created, can contribute, for example, to the ability to identify, in a context of relatively imprecise predefined scan coordinate values, correction terms with which the relatively imprecise scan coordinate values can be replaced with scan coordinate values that are relatively precise with respect thereto. Without correction with the aid of the reference sample, it is possible for distortions of the image of the sample to occur as a result of optical effects of the scanning microscope even when precise predefined scan coordinates (such as, for example, the spherical scan coordinate values recited above) exist. These distortions can be considered and eliminated with the aid of the reference sample.

Any sample that has a well-defined structure, for example a closely-spaced lattice, is suitable as a reference sample. A reference sample having a very precise reference pattern can be generated, for example, by etching a semiconductor substrate, in a manner known from microchip manufacture. The comparison between the image of the reference sample and the reference sample can occur, for example, by comparing the image of the reference sample with a precisely generated reference image of the reference sample. The comparison can, in particular, be carried out automatically with the aid of an image processing system on a computer. Correction of the predefined scan coordinate values can occur, for example, by replacing the predefined scan coordinate values with the corrected scan coordinate values; or only the difference values between the predefined scan coordinate values and the corrected scan coordinate values can be identified, and the differences thus identified, constituting correction terms, can be correlated with the predefined scan coordinate values.

In a refinement, the image of the reference sample is acquired at different zoom steps of the scanning microscope, and the predefined scan coordinate values are corrected as a function of the corresponding zoom step. In other words, the method for identifying corrected scan coordinate values is carried out at different magnifications of the scanning microscope, and the identified corrected scan coordinate values, or the corresponding correction terms, are saved in a manner associated with the corresponding zoom or magnification steps, the scan coordinate values being predefined later on, during operation of the scanning microscope, in accordance with the zoom step that is currently set. The method for identifying the corrected scan coordinate values can be carried out before the confocal scanning microscope is used as intended, or also after the scanning microscope is completed, for example in the form of a regular calibration.

According to a third aspect, the invention is notable for the fact that the illumination light beam is directed onto a sample via the scanning unit of the scanning microscope. The scanning unit is driven, as a function of predefined scan coordinate values, in such a way that the illumination light beam optically scans the sample. Scan coordinate values of the scanning unit that are representative of true positions of the scanning unit are identified. The identified scan coordinate values are corrected. Detected light proceeding from the sample is sensed as a function of the corrected scan coordinate values. The corrected scan coordinate values are associated with image coordinate values in order to identify the image points of an image of the sample. The image points at the image coordinates are identified on the basis of the detected light sensed at the corresponding corrected scan coordinate values. The image of the sample is created on the basis of the identified image points.

According to a fourth aspect, the invention is notable for a method that largely corresponds to the method according to the third aspect; in contrast thereto, the detected light proceeding from the sample is first sensed as a function of the identified scan coordinate values, and then the identified scan coordinate values are corrected, the result being that the association of the detected light with the scan coordinate values is modified.

According to the first or second aspect, the predefined and/or spherical and/or corrected scan coordinate values can in principle be used to drive the scanning unit. Correction of the identified scan coordinate values in accordance with aspects three and four refers, in contrast thereto, to scan coordinate values that are sensed during operation of the scanning microscope. If the scanning unit, and in particular the positioning elements of the scanning unit, are operated with a closed-loop control system, the predefined scan coordinate values can then also be referred to as "target" scan coordinate values, and the identified scan coordinate value also as "actual" scan coordinate values. In other words, for example, in accordance with the first and the second aspect a correction of the target scan coordinate values can occur; and in accordance with the third or fourth aspect a correction of actual scan coordinate values can occur. In this connection, for example, the predefined scan coordinate values can be the aforementioned spherical scan coordinate values or the corrected scan coordinate values, and/or the identified scan coordinate values can be the uncorrected scan coordinate values.

BRIEF DESCRIPTION OF THE DRAWINGS

Exemplifying embodiments of the invention are further explained below with reference to schematic drawings, in which FIG. 3 shows formulas for carrying out the coordinate transformation, FIG. 4 shows a reference sample and an image of the reference sample, FIG. 7 is a flow chart of a first method for operating the confocal scanning microscope, FIG. 8 is a flow chart of a second method for operating the scanning microscope.

Elements of identical design or function are labeled with the same reference characters throughout the Figures.

DETAILED DESCRIPTION OF THE PREFERRED EMBODIMENTS

Figure 1:
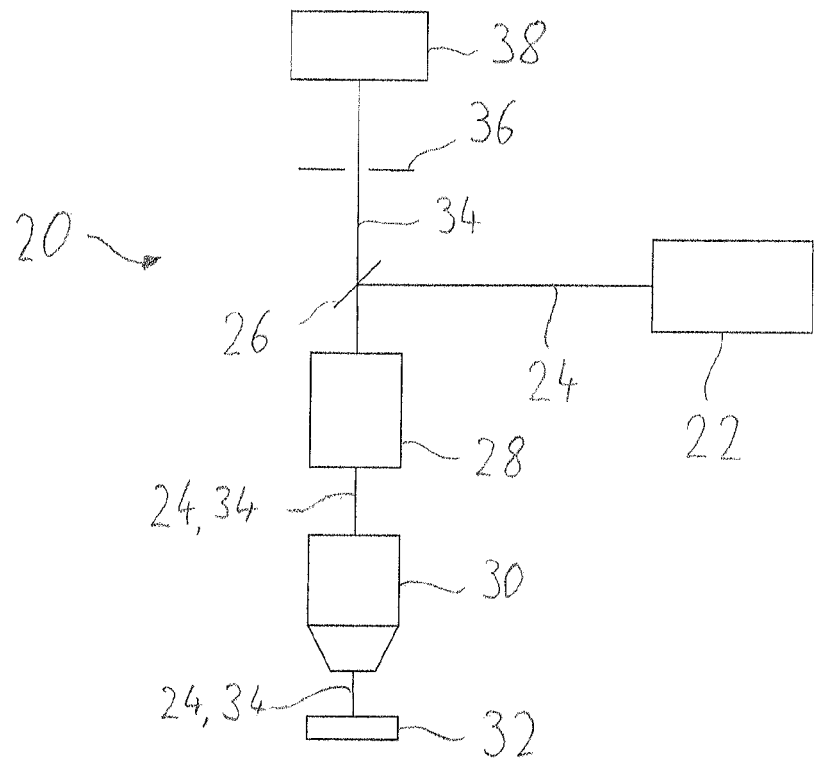
FIG. 1 shows a confocal scanning microscope.

FIG. 1 shows a confocal scanning microscope 20. Scanning microscope 20 comprises a laser light source 22 that generates an illumination light beam 24. Illumination light beam 24 can encompass light of a single wavelength or of multiple wavelengths, for example broad-band laser light, in particular white light. Alternatively or additionally, scanning microscope 20 can encompass further laser light sources that, for example, generate laser light of different wavelengths or wavelength regions. Illumination light beam 24 is directed onto a main beam splitter 26 that is constituted, for example, by a dichroic mirror and that deflects illumination beam path 24 to a scanning unit 28. Scanning unit 28 preferably encompasses one or more mirrors that are coupled to two or more positioning elements. The positioning elements are drivable with the aid of a control unit (not depicted) of scanning microscope 20, and are coupled to the mirror or mirrors in such a way that upon driving of the positioning elements, the mirrors deflect illumination light beam 24 in different directions. Scanning unit 28 directs illumination light beam 24 to an objective 30 that focuses illumination light beam 24 onto a sample that can be, for example, a reference sample 32.

The sample is, for example, a tissue sample which comprises fluorescing substances that, for example, were introduced into the sample, and/or which comprises substances that are activatable with the aid of illumination light beam 24 and, in the active state, can be excited to fluoresce.

Any sample that has a well-defined structure, for example a sample that comprises a closely-spaced lattice, is suitable as reference sample 32. A reference sample 32 of this kind can be etched out of a semiconductor substrate, for example as in the manufacture of a microchip. This can contribute to extremely precise manufacture of the structures of the reference sample, even in the sub-nanometer range.

The detected light proceeding from the sample accordingly encompasses, for example, fluorescent light or reflected light that, in the form of a detected light beam 34, passes through objective 30 to scanning unit 28, which directs detected light beam 34 onto main beam splitter 26, which allows the detected light to pass through to a detection pinhole 36, for example an aperture, to a detector 38.

Scanning unit 28 is operated with scan coordinate values stored on a memory medium of the control unit, and the sensed detected light is sensed as a function of the scan coordinate values. In other words, with the aid of the control unit the sensed detected light is associated with the positions of scanning unit 28 that are currently set, which are represented by the scan coordinate values. These scan coordinate values can be the scan coordinate values with which scanning unit 28 is driven, or, alternatively thereto, sensors can be provided which sense the true positions of the positioning units of scanning unit 28; the scan coordinate values sensed in that fashion can then be associated with the correspondingly sensed detected light. If the positioning elements of scanning unit 28 are operated with the aid of a closed-loop control system, the scan coordinate values with which scanning unit 28 is driven can also be referred to as "target" scan coordinate values, and the sensed scan coordinate values can be referred to as "actual" scan coordinate values.

Figure 2:
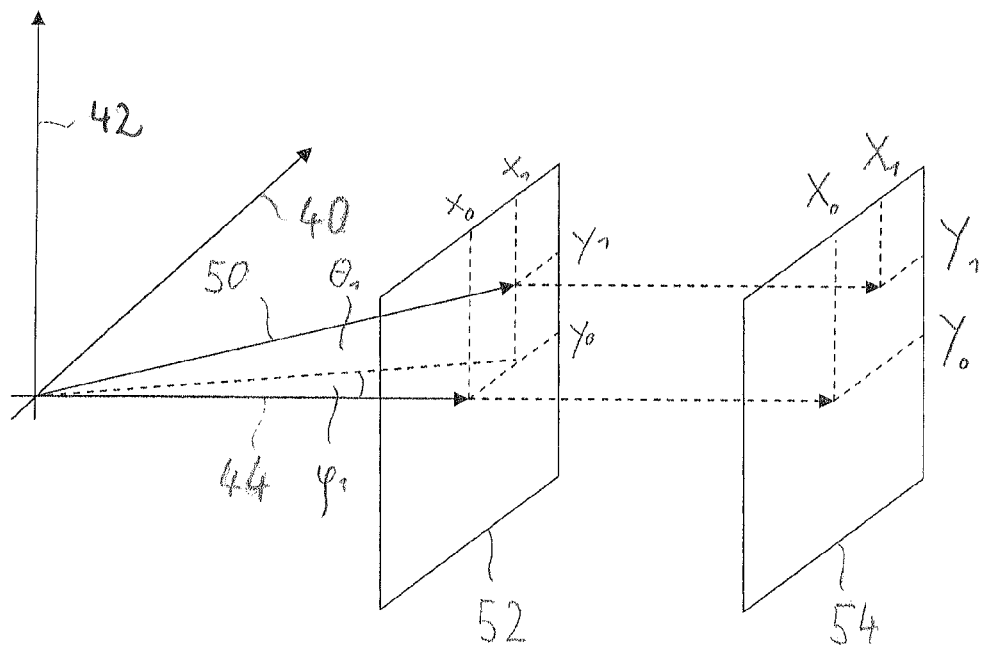
FIG. 2 depicts a coordinate transformation.

FIG. 2 illustrates a coordinate transformation with which Cartesian image coordinate values $X_n, Y_n$, of image points of an image to be created are associated with spherical scan coordinate values $\phi_n$, and $\theta_n$ that represent positions of the positioning elements of scanning unit 28. The coordinate transformation can be carried out, for example, with the formulas F1 to F6 shown in FIG. 3. A transformation of Cartesian coordinates into spherical coordinates is, in particular, illustrated in FIG. 2 and carried out with the formulas in accordance with FIG. 3. The Cartesian coordinate system comprises an X axis 40, a Y axis 42, and a Z axis 44, which are each perpendicular to one another. Alternatively thereto, it may be sufficient if only a two-dimensional Cartesian surface is present, defined e.g. by X axis 40 and Y axis 42. Points in an intermediate image plane 52 and a sample plane 54, in particular image coordinate values $X_n, Y_n$, can be depicted in the Cartesian coordinate system. The Cartesian coordinate system is laid out so that Z axis 44 is representative of a direction and location that correspond to a reference direction and location. A light beam that is deflected in the reference direction and lies on Z axis 44 is referred to as a reference light beam. Scan unit 28, in a reference position, deflects the reference light beam along the reference direction. If illumination light beam 24 corresponds to the reference light beam, it then arrives in the sample plane at a point $x_0, y_0$ that corresponds, in intermediate image plane 52, to the image point having the image coordinate values $X_0, Y_0$.

A transformation arrow 50 is representative of an illumination light beam 24 deflected with respect to the reference light beam. Transformation arrow 50 is at an angle $\phi_1$ to Z axis 40, and at an angle $\Phi_1$ to the plane spanned by X axis 40 and Z axis 44. Illumination light beam 24, deflected in this fashion, arrives in intermediate image plane 52 at a point $x_1, y_1$ that corresponds in sample plane 54 to a point on the sample having coordinate values $X_1, Y_1$. The angles $\phi_r$ and $\theta_n$ can also be referred to as "scan coordinate values."

Formula F1 represents the principle of the transformation of Cartesian image coordinates into a spherical coordinate system. Formula F2 represents the transformation with the aid of transformation arrow 50. The transformation arrow refers to the "r(θ;φ)" in formula F2, where $r_0$ is the distance between the point around which the beam is deflected and intermediate image plane 52 (referring to FIG. 2). This yields the correlation depicted in FIG. 3 for the Cartesian X coordinate, and the correlation depicted in FIG. 4 for the Cartesian Y coordinate. Reconfiguring these formulas yields the relationship shown in formula 5 for the first spherical coordinate value $\phi_i$, and the relationship shown in formula F6 for the second spherical scan coordinate value $\theta_i$.

FIG. 4 shows the surface of reference sample 32, and an image 60 of reference sample 32. The spherical scan coordinate values $\phi_n$, $\theta_n$, identified above, can be used as driving values for scanning unit 28 in order to acquire image 60 of reference sample 32. Even with the use of such precise spherical scan coordinate values $\phi_n$, $\theta_n$, however, distortions can occur at the edges of image 60 of reference sample, these being depicted exaggeratedly in FIG. 4 for better illustration. These distortions can result, for example, from optical effects of the optical elements of scanning microscope 20. Alternatively thereto, relatively imprecise scan coordinate values can also be used to operate scanning microscope 20, for example scan coordinate values that were identified with the aid of mathematical approximations. The distortions then result on the one hand from the optical effects recited above, and because of the approximations in the context of identification of the scan coordinate values.

Figures 5, 6:
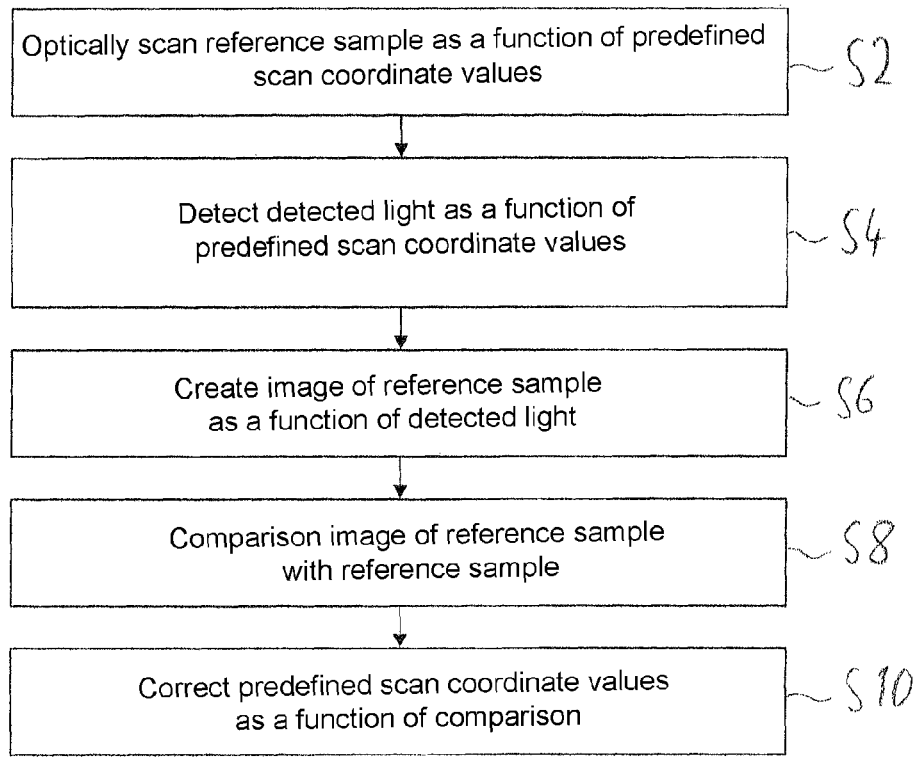
FIG. 5 shows an association specification.
FIG. 6 shows a method for identifying corrected scan coordinate values.

FIG. 5 shows an association specification that is depicted in the form of a table. The association specification can be stored, for example, on a memory medium of scanning unit 28 and/or can be generated with the aid of the coordinate transformation explained above and/or the acquisition of image 60 of reference sample 32. For the operation of scanning microscope 20 as intended, it is sufficient in principle if only two of the columns of the table depicted are stored on the control unit. For example, the first and second, the first and third, or the first and fourth columns can be stored. What thus occurs, respectively, is an association of Cartesian image coordinate values $X_n$, $Y_n$, with spherical scan coordinate values $\phi_n$, $\theta_n$ or corrected scan coordinate values $\phi_{nK}$, $\theta_{nK}$, or the spherical scan coordinate values $\phi_n$, $\theta_n$ that are corrected with the aid of correction terms $\phi_{nL}$, $\theta_{nL}$.

The spherical coordinate values $\phi_n$, $\theta_n$, are obtained preferably with the aid of the coordinate transformation explained in FIG. 2 and FIG. 3. Alternatively or additionally, the corrected scan coordinate values $\phi_{nK}$, $\theta_{nK}$ can be identified with the aid of the acquired image of image 60 of reference sample 32 only, or with the aid of the coordinate transformation and the acquired image of image 60 of reference sample 32. The same applies to the fourth column of the table, in which the spherical scan coordinate values $\phi_n$, $\theta_n$ are corrected with the aid of correction terms $\phi_{nL}$, $\theta_{nL}$, the correction terms being obtained by comparing the spherical scan coordinate values $\phi_n$, $\theta_n$ and the corrected scan coordinate values $\phi_{nK}$, $\theta_{nK}$.

FIG. 6 shows a flow chart of a program for identifying the corrected scan coordinate values $\phi_{nK}$, $\theta_{nK}$ with the aid of reference sample 32.

In a step S2, reference sample 32 is optically scanned as a function of predefined scan coordinate values. The predefined scan coordinate values can be the spherical scan coordinate values $\phi_n$, $\theta_n$ or scan coordinate values that are imprecise relative thereto.

In a step S4, the detected light reflected from reference sample 32 is detected as a function of the predefined scan coordinate values. In other words, what is sensed is, inter alia, how scanning unit 28 is being activated at the moment when a specific component of the detected light is sensed.

In a step S6, image 60 of reference sample 32 is created as a function of the detected light. In particular, the image of reference sample 32 is assembled from individual image points, and the image points are identified on the basis of the detected light. What can occur here is association of the corresponding predefined scan coordinate values, in particular the spherical scan coordinate values $\phi_n$, $\theta_n$ or the corrected scan coordinate values $\phi_{nK}$, $\theta_{nK}$ corrected with the aid of the spherical scan coordinate values $\phi_n$, $\theta_n$, with the Cartesian image coordinate values $X_n$, $Y_n$, of the image points, with the aid of the association specification shown in FIG. 5. The region of reference sample 32 from which the detected light derives is thus known, with the result that a specific image point can be identified.

In a step S8, image 60 of reference sample 32 is compared with reference sample 32. For example, a reference image of reference sample 32 can be created, and image 60 of reference sample 32 can be compared with the reference image, for example with the aid of an image processing program that is stored on a computer. The comparison encompasses the detection of deviations, in particular distortions, between image 60 of reference sample 32 and the reference image. For example, intersection points of image 60 can be compared with intersection points of the reference image, and their spacing and displacement direction can be identified and used for correction.

In a step S10, the predefined scan coordinate values are corrected as a function of the comparison. In this correction, in particular, the displacement of the reference points is taken into consideration in such a way that upon subsequent driving of scanning unit 28, the intersection points of image 60 correspond to the reference points in reference sample 32. The corrected scan coordinate values $\phi_{nK}$, $\theta_{nK}$ can be stored in the association specification, in addition to the spherical scan coordinate values $\phi_n$, $\theta_n$ or the predefined scan coordinate values. Alternatively thereto, the predefined scan coordinate values can be replaced by the corrected ones $\phi_{nK}$, $\theta_{nK}$. Alternatively thereto, only the difference terms between the predefined scan coordinate values and the corrected scan coordinate values $\phi_{nK}$, $\theta_{nK}$ can be identified, and stored in correlation with the predefined scan coordinate values.

When further samples are examined, for example tissue samples, scanning unit 28 can then, as described in connection with FIG. 1, be driven on the basis of the corrected scan coordinate values $\phi_{nK}$, $\theta_{nK}$ or the predefined scan coordinate values with correction values $\phi_{nL}$, $\theta_{nL}$. If the positions of the positioning elements of scanning unit 28 are controlled in closed-loop fashion, the corrected scan coordinate values $\phi_{nK}$, $\theta_{nK}$, or the predefined scan coordinate values with the correction terms $\phi_{nL}$, $\theta_{nL}$ are then the target scan coordinate values that define the target positions of the positioning elements of scanning unit 28.

FIG. 7 shows a flow chart of a method for operating the confocal scanning microscope 20. The method is suitable for acquiring an image of a tissue sample. In a step S12 the sample is optically scanned as a function of the predefined scan coordinate values. The predefined scan coordinate values can be the scan coordinate values identified by approximation, the spherical scan coordinate values $\phi_n$, $\theta_n$, or the scan coordinate values determined by approximation that are corrected with the aid of the spherical scan coordinate values $\phi_n$, $\theta_n$, i.e. the corrected scan coordinate values $\phi_{nK}$, $\theta_{nK}$.

In a step S14, scan coordinate values that correspond to the true positions of the positioning elements of scanning unit 28 are sensed. It is preferable to provide for this purpose sensors that sense the positions of the positioning elements. If scanning unit 28 is operated with the aid of the closed-loop control system, the sensed scan coordinate values can also be referred to as "actual" scan coordinate values.

In a step S16, the sensed scan coordinate values are corrected. By preference, the sensed scan coordinate values (if they are the scan coordinate values determined by approximation) are corrected with the aid of the spherical scan coordinate values $\phi_n$, $\theta_n$ and/or with the aid of the correction shown by the method in FIG. 6.

In a step 18, the detected light is sensed as a function of the corrected scan coordinate values.

In a step S20, the image of the sample is assembled on the basis of the sensed detected light, corresponding to creation of the image of reference sample 32 in step S6 of the method shown in FIG. 6.

FIG. 8 shows a method, alternative to the method shown in FIG. 7 for operating scanning microscope 20, for operating the confocal scanning microscope 20. Steps S22 to S30 of the second program for operating scanning microscope 20 correspond to steps S12 to S20 of the first method for operating the scanning microscope, steps S26 and S28 being reversed in sequence as compared with steps S16 and S18. In particular, step S26, in which the detected light is sensed as a function of the sensed scan coordinate values, in particular as a function of the not-yet-corrected sensed scan coordinate values, or the not-yet-corrected actual scan coordinate values, is performed first. The sensed scan coordinate values or actual scan coordinate values are then subsequently corrected in step S28.

In other words, in the method shown in FIG. 7 the correction of the actual values occurs during acquisition of the image and during sensing of the detected light; in contrast thereto, the method in FIG. 8 can also be carried out later on, after detection of the detected light has ended. In the context, for example, of an existing and known scanning microscope that generates relatively imprecise images of the samples, it is thus still possible, with the aid of the method shown in FIG. 8, for a precise image having no distortions to be created at a later time.

The confocal scanning microscope 20 shown in FIG. 1 is depicted merely schematically. In particular, a microscope of this kind, which is very well known from the corresponding technical literature, comprises considerably more mirrors, apertures, and optical elements such as focusing lenses and parallelizing lenses. In addition, microscopy methods other than fluorescence microscopy can also be carried out using the confocal scanning microscope. The method of the present invention is applicable to all scanning methods.

PARTS LIST

20 Scanning microscope
22 Laser light source
24 Illumination light beam
26 Main beam splitter
28 Scanning unit
30 Objective
32 Reference sample
34 Detected light beam
36 Detection pinhole
38 Detector
40 X axis
42 Y axis
44 Z axis
50 Transformation arrow
52 Intermediate image plane
54 Sample plane
60 Image of reference sample
$x_n$, $y_n$ Sample coordinate values
$X_n$, $X_y$ Cartesian image coordinate values
$\phi_n$, $\theta_n$ Scan coordinate values
$\phi_{nK}$, $\theta_{nK}$ Corrected scan coordinate values
$\phi_{nL}$, $\theta_{nL}$ Correction term
F1-F6 Formulas one to six
S2-S20 Steps two to twenty

What is claimed is:

1. A method for identifying scan coordinate values for operating a scanning unit of a confocal scanning microscope, the method comprising:
  directing an illumination light beam via the scanning unit of the scanning microscope onto a sample;
  identifying spherical scan coordinate values as a function of Cartesian image coordinates of image points of an image to be created of the sample, with the aid of a coordinate transformation of the Cartesian image coordinate values into a spherical coordinate system;
  considering different possible zoom steps of the scanning microscope, by predefining spacings of the image points with respect to one another as a function of the zoom steps, when the spherical scan coordinate values are identified; and
  operating the scanning unit as a function of the spherical scan coordinate values.

2. The method according to claim 1, comprising identifying first spherical scan coordinate values with the aid of the coordinate transformation, and identifying second spherical scan coordinate values by interpolation of the first scan coordinate values.

3. The method according to claim 1, comprising correcting predefined scan coordinate values on the basis of the spherical scan coordinate values.

4. A method for identifying corrected scan coordinate values for operating a scanning unit of a confocal scanning microscope, the method comprising:
  directing an illumination light beam via the scanning unit of the scanning microscope onto a reference sample;
  driving the scanning unit, as a function of predefined scan coordinate values, in such a way that the illumination light beam optically scans the reference sample;
  sending detected light proceeding from the reference sample as a function of the predefined scan coordinate values;
  associating the predefined scan coordinate values with image coordinate values of image points of an image to be identified of the reference sample;
  identifying the image points at the image coordinate values on the basis of the detected light sensed at the corresponding predefined scan coordinate values;
  creating the image of the reference sample on the basis of the identified image points;
  comparing the image of the reference sample with the reference sample; and
  correcting the predefined scan coordinate values as a function of the comparison,
  wherein different possible zoom steps of the scanning microscope are considered, by predefining spacings of the image points with respect to one another as a function of the zoom steps, when the image coordinate values identify the image points.

5. The method according to claim 4, comprising acquiring the image of the reference sample at different zoom steps of the scanning microscope, and correcting the predefined scan coordinate values as a function of the corresponding zoom step.

6. A method for creating an image of a sample with the aid of a confocal scanning microscope, the method comprising:
  directing an illumination light beam onto a sample via a scanning unit of the scanning microscope;
  identifying spherical scan coordinate values as a function of Cartesian image coordinate values of image points of the image to be created of the sample by transforming the Cartesian image coordinate values into a spherical coordinate system;

storing the Cartesian image coordinate values and the corresponding spherical scan coordinate values in an association specification table;

driving the scanning unit, as a function of the stored spherical scan coordinate values, in such a way that the illumination light beam optically scans the sample;

identifying spherical scan coordinate values of the scanning unit that are representative of true positions of the scanning unit;

correcting the identified spherical scan coordinate values;

sensing detected light proceeding from the sample as a function of the corrected spherical scan coordinate values;

associating the corrected spherical scan coordinate values with the stored spherical image coordinate values of the image points of the image of the sample that are to be identified;

identifying the image points on the basis of the detected light sensed at the corresponding corrected spherical scan coordinate values;

considering different possible zoom steps of the scanning microscope, by predefining spacings of the image points with respect to one another as a function of the zoom steps, when the spherical scan coordinate values are identified; and creating the image of the sample on the basis of the identified image points.

7. A method for creating an image of a sample with the aid of a confocal scanning microscope, the method comprising:

directing a illumination light beam onto a sample via a scanning unit of the scanning microscope;

driving the scanning unit, as a function of predefined scan coordinate values, in such a way that the illumination light beam optically scans the sample;

identifying scan coordinate values of the scanning unit that are representative of true positions of the scanning unit;

sensing detected light proceeding from the sample as a function of the identified scan coordinate values;

correcting the identified scan coordinate values;

associating the corrected scan coordinate values with image coordinate values of image points of an image of the sample that are to be identified;

identifying the image points at the image coordinate values on the basis of the detected light sensed at the corresponding corrected scan coordinate values;

considering different possible zoom steps of the scanning microscope, by predefining spacings of the image points with respect to one another as a function of the zoom steps, when the image coordinate values are identified; and creating the image of the sample on the basis of the identified image points.

8. A method for operating a scanning unit of a confocal scanning microscope, comprising:

identifying spherical scan coordinate values as a function of Cartesian image coordinate values of image points of an image to be created of a sample, with the aid of a coordinate transformation of the Cartesian image coordinate values into corresponding spherical scan coordinate values of a spherical coordinate system;

storing the Cartesian image coordinate values and the corresponding spherical scan coordinate values in an association specification;

considering different possible zoom steps of the microscope, by predefining spacings of the image points with respect to one another as a function of the zoom steps, when the spherical scan coordinate values are identified; and operating the scanning unit as a function of the stored spherical scan coordinate values.

9. The method of claim 8, wherein the association specification is a table.

* * * * *